United States Patent
Starr et al.

(10) Patent No.: US 8,850,080 B2
(45) Date of Patent: Sep. 30, 2014

(54) MOBILE MEDIA IDENTIFICATION SYSTEM FOR USE WITH A STORAGE DEVICE

(75) Inventors: Matthew Thomas Starr, Lafyette, CO (US); Richard Douglas Rector, Arvada, CO (US)

(73) Assignee: Spectra Logic Corporation, Boulder, CO (US)

( * ) Notice: Subject to any disclaimer, the term of this patent is extended or adjusted under 35 U.S.C. 154(b) by 2240 days.

(21) Appl. No.: 11/040,937

(22) Filed: Jan. 21, 2005

(65) Prior Publication Data

US 2006/0164928 A1 Jul. 27, 2006

(51) Int. Cl.
*G06F 3/00* (2006.01)
*G11B 33/12* (2006.01)

(52) U.S. Cl.
CPC .................................. *G11B 33/128* (2013.01)
USPC ................................. 710/15; 710/16; 710/17

(58) Field of Classification Search
USPC ........................................................... 710/15
See application file for complete search history.

(56) References Cited

U.S. PATENT DOCUMENTS

| | | | | | |
|---|---|---|---|---|---|
| 5,357,495 | A | * | 10/1994 | Solhjell | 369/30.3 |
| 5,450,388 | A | * | 9/1995 | Baas | 369/44.32 |
| 5,729,464 | A | * | 3/1998 | Dimitri | 700/215 |
| 6,366,550 | B1 | * | 4/2002 | Shiba | 369/178.01 |
| 2002/0141582 | A1 | * | 10/2002 | Kocher et al. | 380/201 |
| 2004/0044842 | A1 | | 3/2004 | Trimmer et al. | |
| 2004/0105187 | A1 | | 6/2004 | Woodruff et al. | |
| 2004/0111251 | A1 | | 6/2004 | Trimmer et al. | |
| 2004/0181388 | A1 | | 9/2004 | Yip et al. | |
| 2004/0223253 | A1 | | 11/2004 | Woodruff et al. | |
| 2004/0264037 | A1 | | 12/2004 | Downey et al. | |
| 2004/0264038 | A1 | | 12/2004 | Heineman et al. | |
| 2004/0264039 | A1 | | 12/2004 | Armagost et al. | |
| 2004/0264040 | A1 | | 12/2004 | Armagost et al. | |
| 2004/0264041 | A1 | | 12/2004 | Kumpon et al. | |
| 2004/0264042 | A1 | | 12/2004 | Pollard et al. | |
| 2005/0007692 | A1 | | 1/2005 | Thompson et al. | |
| 2005/0036397 | A1 | * | 2/2005 | Yeh et al. | 365/232 |
| 2005/0047258 | A1 | | 3/2005 | Starr et al. | |
| 2005/0052927 | A1 | * | 3/2005 | Barrieau | 365/222 |
| 2005/0063089 | A1 | | 3/2005 | Starr et al. | |
| 2005/0065637 | A1 | | 3/2005 | Lantry et al. | |
| 2005/0185323 | A1 | | 8/2005 | Brace et al. | |
| 2005/0190660 | A1 | * | 9/2005 | Wakelin et al. | 369/30.27 |
| 2005/0195517 | A1 | | 9/2005 | Brace et al. | |
| 2005/0195518 | A1 | | 9/2005 | Starr et al. | |

(Continued)

OTHER PUBLICATIONS

U.S. Appl. No. 10/950,613, Starr et al.

(Continued)

*Primary Examiner* — Henry Tsai
*Assistant Examiner* — Dean Phan
(74) *Attorney, Agent, or Firm* — Kenneth Altshuler

(57) ABSTRACT

Disclosed is a method and apparatus system to identify mobile media magazine for use with a storage device. The system comprises a random access memory magazine capable of comprising a plurality of random access memory devices. The magazine further comprising a magazine identifier label disposed to be externally viewable. The magazine also comprises at least one storage element cooperating with the magazine adapted to store an electronic magazine identifier that represents the magazine identifier label in non-volatile memory. Each of the random access memory devices can further comprise an individual random access memory device label. The storage device can be adapted to identify the magazine by the magazine identifier label, the electronic magazine identifier or both.

11 Claims, 11 Drawing Sheets

(56) References Cited

U.S. PATENT DOCUMENTS

| | | |
|---|---|---|
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/089,749, Starr et al.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Landry et al.
PCT Application No. US05/45168, Dec. 14, 2005, Spectra Logic Corporation.
PCT Application No. US05/46447, Dec. 20, 2005, Spectra Logic Corporation.
International Publication No. WO 2005/010661 A2, Feb. 3, 2005, Spectra Logic Corporation.

* cited by examiner

MOBILE MEDIA IDENTIFICATION SYSTEM FOR USE WITH A STORAGE DEVICE

CROSS-REFERENCE TO RELATED APPLICATIONS

None.

FIELD OF THE INVENTION

The present invention relates generally to identifying a mobile random access memory magazine with at least two means of identification.

BACKGROUND

Data storage libraries, and more particularly tape libraries having mobile tape cassette media, are typically used to store and retrieve large amounts of data for archiving purposes. Tape libraries are generally comprised of drive systems adapted to read and write data to and from tapes often housed within the tape libraries. In some instances, tapes are archived at locations within the library or, alternatively, moved out of the library for safe keeping. However, due to a gain in momentum in disc drive technology, innovations including mobile disc drive magazines assembled from multiple disc drives operating together as a cooperative media article are poised for introduction in the market place. New library devices adapted to operate with multiple mobile disc drive magazines are one example of the products poised to take advantage of this new technology.

Mobile disc drive magazines have many of the advantages enjoyed by tape cassettes including the ability to be archived in remote locations relative to the magazine based libraries. Other advantages of disc drive magazines include the random access memory capabilities inherent in disc drives, providing superior data access over the slow linear data access of tape cassettes. Due to the mobility of disc drive magazines and the potential mobility of their components, i.e. the disc drives, identification schemes for identifying magazines and components are desirable.

In an effort to provide a mobile media identification system for use with a storage device, both methods and apparatuses are proposed herein. It is to innovations related to this subject matter that the claimed invention is generally directed.

SUMMARY OF THE INVENTION

The present invention relates generally to identifying a mobile random access memory magazine with at least two means of identification for use with a storage device and provides a method and apparatus for identifying the random access magazine from a remote storage location and/or the storage device.

One embodiment of the present invention can therefore comprise a mobile media identification system for use with a storage device comprising: a random access memory magazine capable of comprising a plurality of random access memory devices; the magazine further comprising a magazine identifier label disposed to be externally viewable and at least one storage element cooperating with the magazine adapted to store an electronic magazine identifier that represents the magazine identifier label in non-volatile memory; and the storage device adapted to identify the magazine by the magazine identifier label, electronic magazine identifier or both the magazine identifier label and the electronic magazine identifier.

Another embodiment of the present invention can therefore comprise a method for using a mobile media identification system comprising: searching for a random access memory magazine from a plurality of random access memory magazines, each of the magazines comprising a magazine identifier label and an electronic magazine identifier; identifying the random access memory magazine from the magazine identifier label, the electronic magazine identifier or both the magazine identifier label and the electronic magazine identifier; and enabling a storage device to use the identified random access memory magazine.

Yet another embodiment of the present invention can therefore comprise a means for using a mobile media identification system comprising: means for searching for a random access memory magazine from a plurality of random access memory magazines, each of the magazines comprising at least two identification means; means for identifying the random access memory magazine from at least one of the identification means; and means for enabling a storage device to use the identified random access memory magazine.

Yet another embodiment of the present invention can therefore comprise a mobile media identification system for use with a storage device comprising: a random access memory magazine capable of comprising a plurality of random access memory devices; the magazine further comprising a magazine identifier label disposed to be externally viewable and at least one storage element cooperating with the magazine adapted to store an electronic magazine identifier that represents the magazine identifier label in non-volatile memory; each of the random access memory devices further comprise an individual random access memory device label; and the storage device adapted to identify the magazine by the magazine identifier label, the electronic magazine identifier or both the magazine identifier label and the electronic magazine identifier.

Yet another embodiment of the present invention can therefore comprise a mobile media for use with a storage device, the mobile media comprising: a random access memory magazine having a first identifying indicia disposed thereon such that the first identifying indicia is externally viewable and a non-volatile memory for storing an electronic representation of the first identifying indicia; and at least one storage element situated within the magazine comprising a second identifying indicia, wherein at least one of the first identifying indicia and the second identifying indicia is usable by the storage device to identify the mobile media.

DETAILED DESCRIPTION

Figure 1:
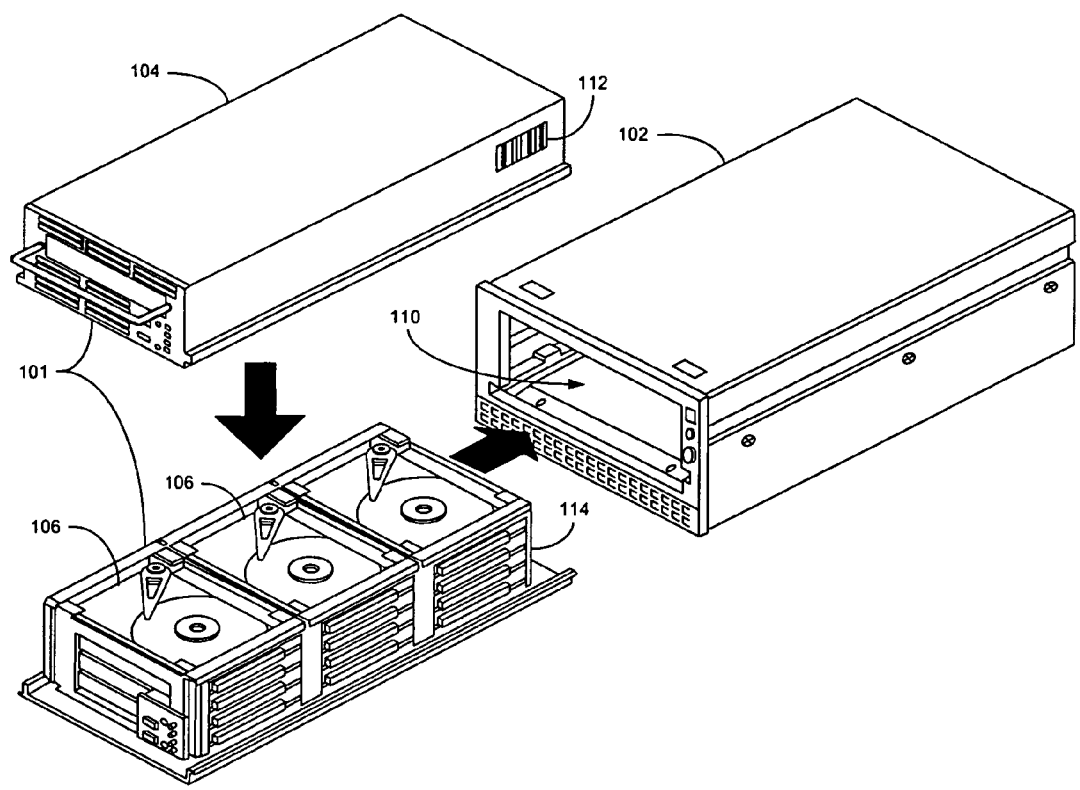
FIG. 1 is an exploded perspective view of a mobile disc drive magazine and disc drive magazine docking station consistent with embodiments of the present invention.

Referring to the drawings in general, and more specifically to FIG. 1, shown therein is an exploded perspective view of a mobile disc drive magazine 101, which is an embodiment of a random access memory magazine, and a docking station 102 constructed in accordance with an embodiment of the present invention. In what follows, similar or identical structure is identified using identical callouts.

While the claimed invention has utility in any number of different applications, the mobile disc drive magazine 101 and docking station 102 of FIG. 1 have been provided to illustrate a particularly suitable environment in which the claimed invention can be advantageously practiced. In this embodiment, a plurality of disc drives 106 are substantially contained by an enclosure 104 generally comprising the mobile disc drive magazine 101. A conventional, magnetic disc drive 106 is only one embodiment of a random access memory device, which, in further embodiments, could include flash memory and optical memory, just to name a few. The mobile disc drive magazine 101 is adapted to be received by an opening 110 in the docking station 102, which is an example of a suitable location for using the mobile disc drive magazine 101 with a storage device, such as a storage library. In an alternative embodiment, the docking station could be used as a stand-alone storage device. The engaging surface 114 of the mobile disc drive magazine 101 is adapted with electrical contacts (not shown) to contact with complementary electrical contacts (not shown) on the engaging surface (not shown) of the docking station 102. When contact is made, the transmission of data can occur between the docking station 102 and the mobile disc drive magazine 101. Furthermore, power can be provided to the mobile disc drive magazine 101 by the docking station 102. Power and data transmission provide a cooperatively linked state between the mobile disc drive magazine 101 and the docking station 102. The mobile disc drive magazine docking station 102 is capable of being electrically connected with a host device, such as a computer for example, or other storage device/s, such as a storage library for example, by a coupling means, such as wires, plugs-in, wireless transmission (e.g., IR, RF) or any combination or equivalence thereof, just to name a few examples. By linking the docking station 102 with a storage device, such as a library, a connected disc drive magazine 101 is effectively in a cooperatively linked state with the storage device. Additionally, communication to the docking station 102 can include the described electrical connections in addition to wireless, such as Radio Frequency or IR for example. The enclosure 104 shows an example of a magazine identifier label, in this case a bar code 112, used for identifying the mobile disc drive magazine 101, such as for archiving in a remote storage location for example. In one embodiment, the mobile disc drive magazine 101 could be configured to operate as a RAID (Redundant Array of Independent Disc [drives]) device.

Figure 2A:
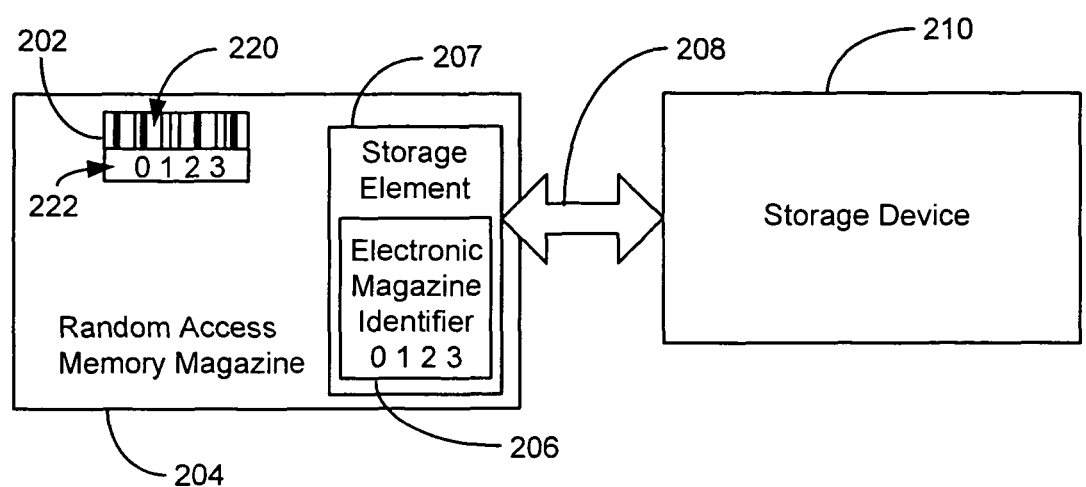
FIG. 2A is a block diagram showing a random access memory magazine identification embodiment of the present invention using an electronic magazine identifier.

FIG. 2A is a block diagram showing a random access memory magazine 204 identification embodiment of the present invention using an electronic magazine identifier 206. Here, a random access memory magazine 204 has a magazine identifier label 202 disposed to be externally viewable in addition to an electronic magazine identifier 206 stored in a non-volatile storage element 207 cooperating with the magazine 204. The electronic magazine identifier 206, or other electronic label data, could be stored in non-volatile memory by an original equipment manufacturer or by a user for example. Means for storing electronic label data could be accomplished manually or by an algorithm coupled with a label identification system for automatic set up or confirmation, just to name a couple of examples. One form of an electronic magazine identifier 206 is a digital magazine identifier, for example. By externally viewable, the identifier label 206 could be disposed on an outer surface of the magazine 204 or on an inner surface such that the identifier label 206 is viewable by an external onlooker, such as if the magazine 204 was transparent or had a hole exposing the identifier label disposed on an inner surface for example. The storage element 207 cooperates with the magazine 204 to provide an electronic representation corresponding to the magazine's 204 identification label 202 for use by the storage device 210. The storage element 207 could be disposed in the magazine 204 or on a fixture attached to the magazine 204, just to illustrate two constructions. Additionally, the storage element 207 could be a dedicated memory system, such as a flash memory chip, or a random access memory component of the magazine 204, or an RF-ID tag for example. The identifier label 202, in this example, has a number [0 1 2 3] 222 corresponding to a bar code 220 that could be read by a bar code reader, such as a three of nine bar code reader. A storage device 210, capable of using the magazine 204 in a data storage relationship (i.e. reading data from and writing data to the magazine 204), is adapted to identify the magazine 204 from the electronic magazine identifier 206 by means of communicating 208 with the storage element 207 comprising the electronic magazine identifier 206, such as by wire-line, wire-less or a combination thereof, for example. This could be accomplished by any number of ways including solicitation 208 from the storage device 210 to the magazine 204 requesting an identification number, and the magazine 204 responding by sending 208 the electronic magazine identifier [0 1 2 3] 206 from the memory element 207 cooperating with the magazine 204. In another example, the storage device 210 could send out 208 a search request to a plurality of magazines in search of magazine [0 1 2 3] 204 whereby the storage device 210 could then receive 208 an identification confirmation response from the appropriate magazine 204.

Figure 2B:
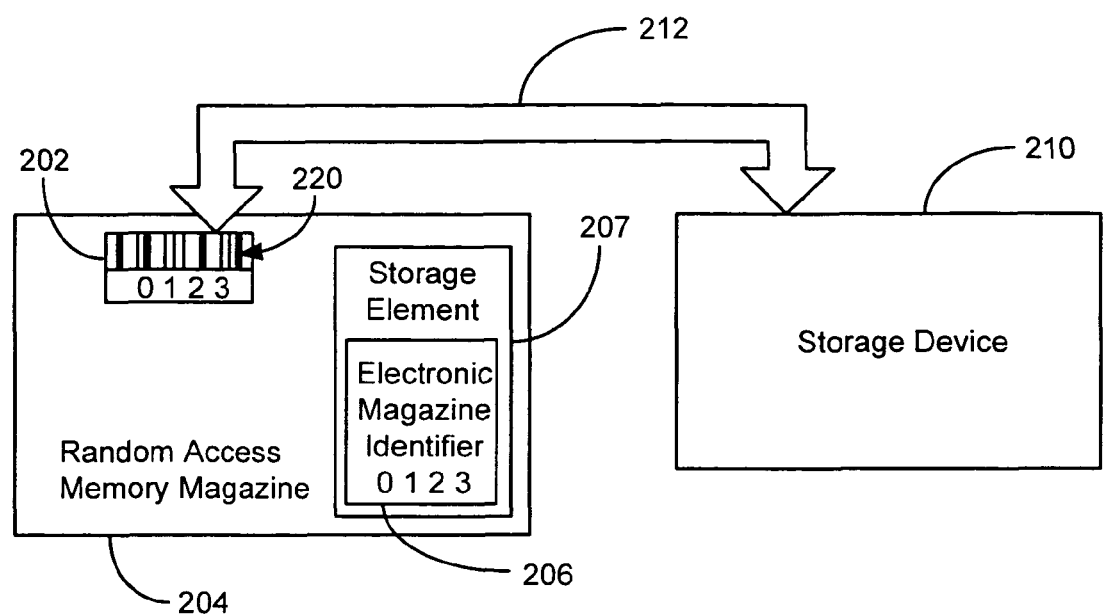
FIG. 2B is a block diagram of an alternative embodiment of the present invention showing random access memory magazine identification with a magazine identifier label.

FIG. 2B is a block diagram of an alternative embodiment of the present invention showing random access memory magazine 204 identification with a magazine identifier label 202. Here, the storage device 210 is capable of identifying the random access memory magazine 204 by reading 212 the magazine identifier label 202. One example of a means for reading the magazine 204 could be from an optical scanner, such as a bar code scanner, for example. In the event the magazine 204 is archived in a storage facility different from the storage device 210, such as a remote archive vault, the magazine 204 could be identified from the magazine identifier label 202 by an optical scanner or visually by a person, just to name a couple of examples.

Figure 3:
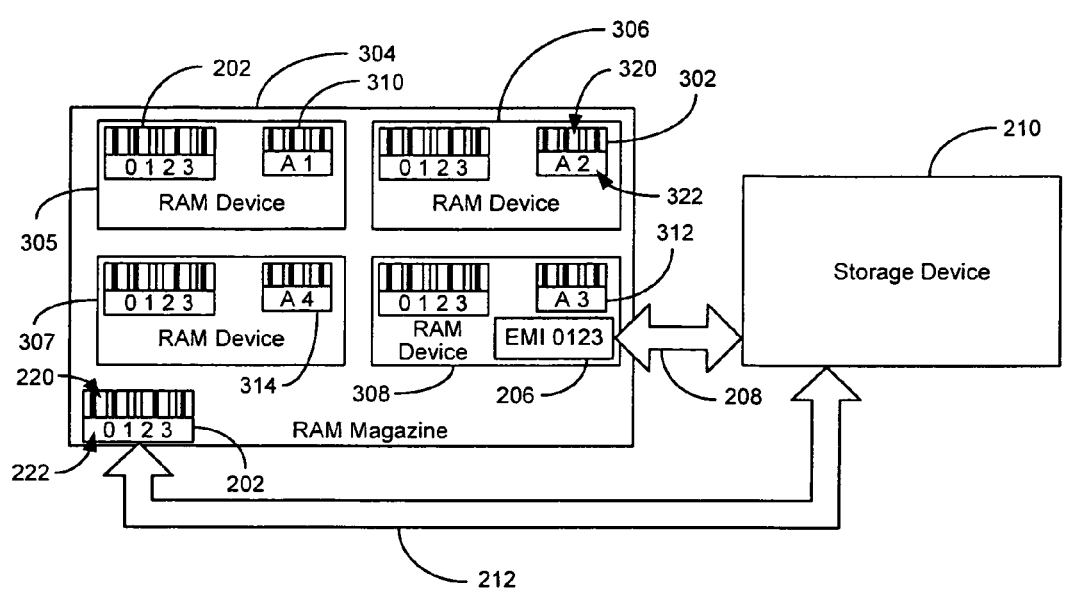
FIG. 3 is a block diagram of another embodiment of the present invention showing the electronic magazine identifier stored at a random access memory device disposed in the random access memory magazine.

FIG. 3 is a block diagram of another embodiment of the present invention showing the electronic magazine identifier 206 stored in a random access memory device [A3] 308 disposed in the random access memory magazine 304. The random access memory device [A3] 308 serves as the non-volatile memory storage element cooperating with the magazine 304. Here, the magazine 304 comprises four Random Access Memory (RAM) devices 305, 306, 307 and 308 each comprising a magazine identifier label 202 with the same information as the magazine identifier label 202 for the magazine 304. In one embodiment, the magazine identifier label 202 for the RAM devices, such as device 306, could be identical to the magazine identifier label 202 for the magazine 304. In addition, each RAM device, such as device 306, further comprises an individual RAM label, such as RAM label 310, shown here as a bar code 320 with a corresponding number 322. The individual RAM labels, in a preferred embodiment, are unique to each of the RAM devices 306 and 308 shown here as [A1] 310, [A2] 302, [A3] 312 and [A4] 314. Hence, each RAM device 306 and 308 comprises the common magazine identifier label 202 and an individual RAM label, such as [A1] 310, unique to each RAM device 306 and 308. One advantage of having individual RAM labels, such as [A1] 310, is the ability to keep track of each RAM device [A3] 308 that comprises the magazine 304. The magazine 304 in this embodiment further comprises the electronic magazine identifier 206 stored at the RAM device [A3] 308. It should be recognized by one skilled in the art that the electronic magazine identifier 206 could be stored on any number of, including all, the RAM devices 306 and 308. Here, the storage device 210 is adapted to identify the magazine 304 from the electronic magazine identifier 206 stored at the RAM device [A3] 308 by the communication link 208 in addition to identifying the magazine 304 from the magazine identifier label 202 with a means for reading the magazine identifier label 202, such as an optical bar code reading device for example.

Figure 4A:
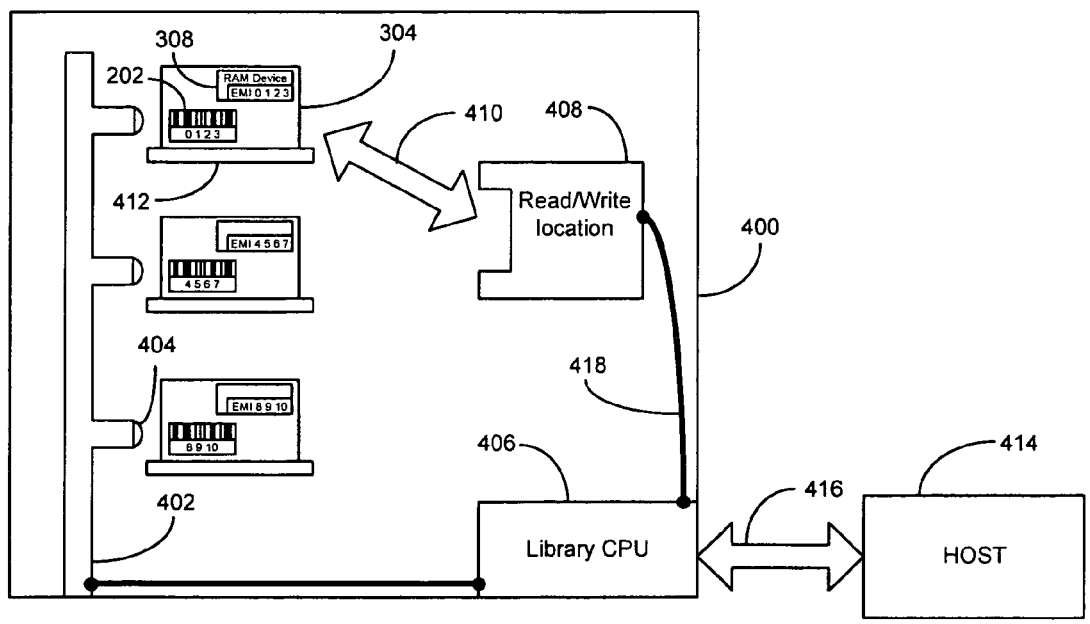
FIG. 4A is a block diagram illustrating use of the magazine identifier label to identify the magazine consistent with embodiments of the present invention.
Figure 4B:
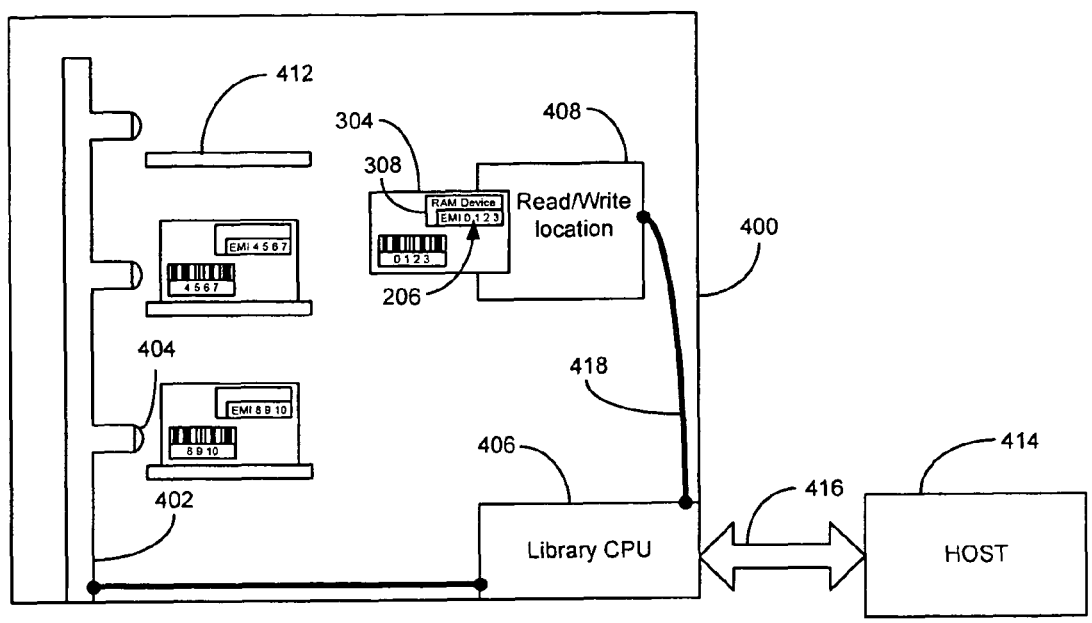
FIG. 4B is a block diagram illustrating use of the electronic magazine identifier to identify the magazine consistent with embodiments of the present invention.

FIGS. 4A and 4B are block diagrams serving to illustrate using both the magazine identifier label 202 and the electronic magazine identifier 206 to identify the magazine 304. Referring to FIG. 4A, the storage device 210 could be a robotics based library 400 configured to move magazines, such as 304, by a robotic means 410 from an archive location 412 within the robotics based library 400 to a location 408 suitable for use with the library 400, i.e. capable of performing read and write operations with the magazine 304. In this example, an optical bar code reading device 402 could be positioned with a lens system 404 for reading a magazine identifier label, such as label [0 1 2 3] 202. If magazine [0 1 2 3] 304 with magazine identifier label [0 1 2 3] 202 is requested 416 by a host 414, the library Central Processing Unit (CPU) 406 could search for magazine [0 1 2 3] 304 via the optical system 402 and 404. Once identified from the magazine identifier label 202, the magazine [0 1 2 3] 304 could be moved by the robotics means 410 from the archive location 412 to the read/write location 408. Referring now to FIG. 4B, the identified magazine [0 1 2 3] 304 is shown in position 408 to read and write with the library 400 by the robotics means, such as a robotics system. The identity of the magazine [0 1 2 3] 304 can be confirmed by accessing the electronic magazine identifier 206 stored at the RAM device [A3] 308. Here, the library CPU 406 is linked 418 to the read/write location 408 to electronically communicate with and confirm the magazine [0 1 2 3] 304 now activated, or enabled, in a communicative state with the library 400. Hence, both the magazine identifier label 202 and the electronic magazine identifier 206 could be used by the robotics based library 400 to identify the magazine [0 1 2 3] 304. Alternatively, the functions ascribed to library CPU 406 could be carried out at a server or host computer that is in data communication (e.g., over a network) with library 400.

Figure 5:
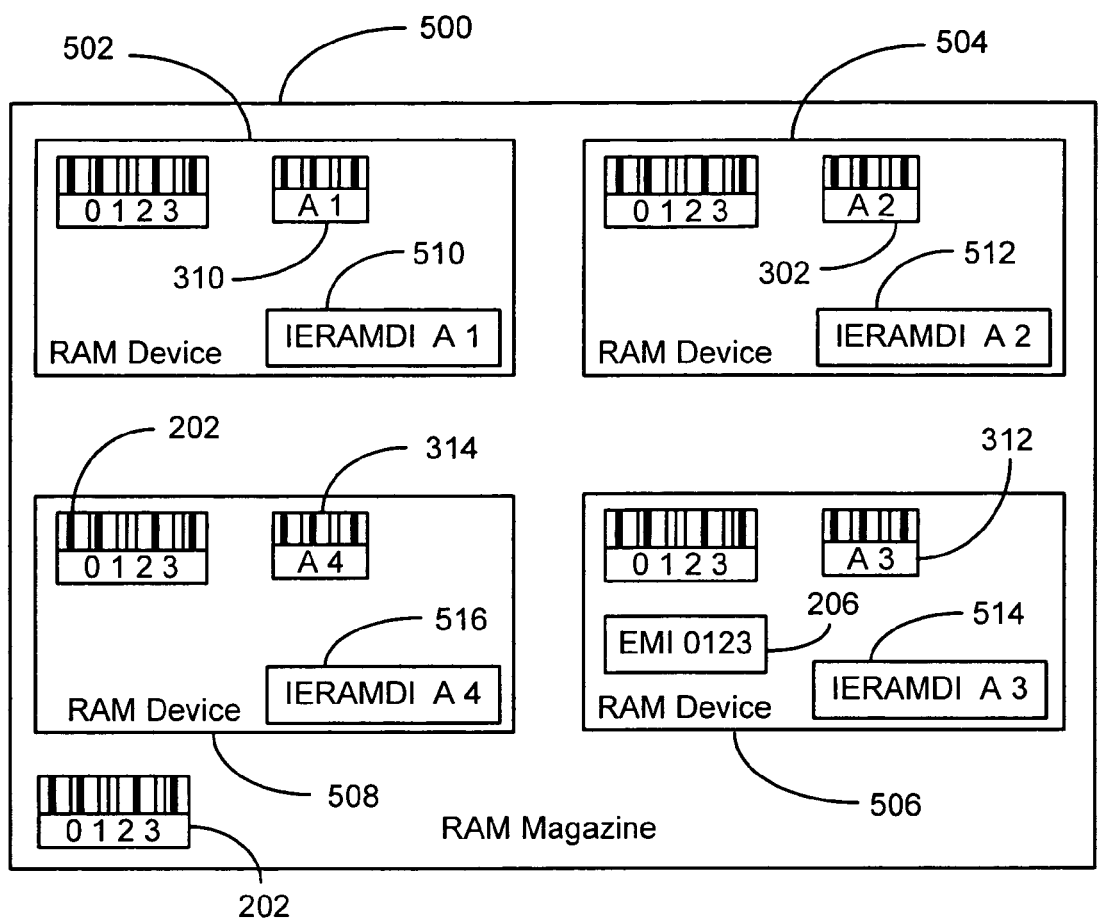
FIG. 5 is a block diagram of a magazine comprising multiple RAM devices each having an individual electronic RAM device identifier consistent with embodiments of the present invention.

FIG. 5 is a block diagram of an embodiment of a magazine 500 comprising multiple RAM devices, with each one having an individual electronic RAM device identifier, such as IERAMDI [A1] 510. Here, the magazine 500 comprises four RAM devices, RAM device [A1] 502, RAM device [A2] 504, RAM device [A3] 506, RAM device [A4] 508, each having individual RAM labels that in the illustrative embodiment are unique to each RAM device, shown here as [A1] 310, [A2] 302, [A3] 312 and [A4] 314, respectively. Each respective RAM device also comprises an individual electronic RAM device identifier, IERAMDI [A1] 510, IERAMDI [A2] 512, IERAMDI [A3] 514 and IERAMDI [A4] 516 corresponding to the content of each individual RAM label. The magazine 500 that includes all four RAM devices also comprise the magazine identifier label 202. One advantage of having individual electronic RAM device identifiers, such as IERAMDI [A1] 510, is for electronic confirmation, through the storage device for example, as to the identity of each RAM device, such as RAM device [A1], in any given magazine, such as magazine 500. It should be clear to one skilled in the art that a form of an electronic RAM device identifier is a digital RAM device identifier. As disclosed previously, one or more of the RAM devices, in this case RAM device [A3] 506, could contain an electronic magazine identifier 206 stored in non-volatile memory for identifying the magazine 500.

Figure 6:
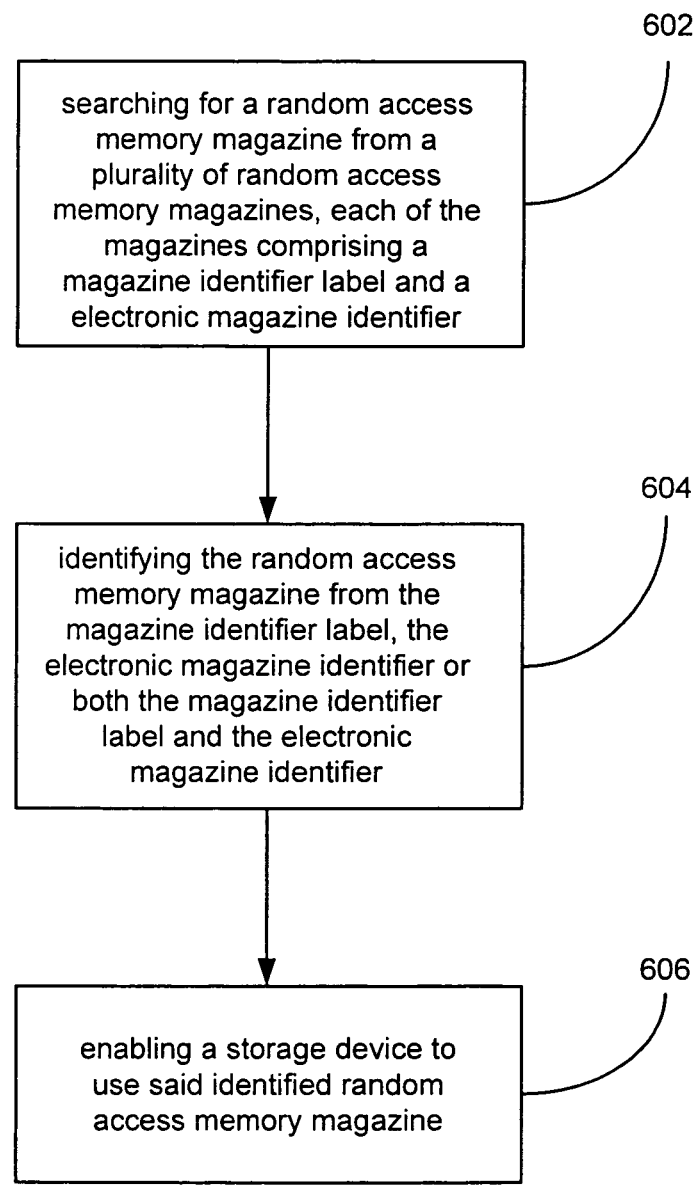
FIG. 6 shows a flow diagram of a method for using a mobile media identification system consistent with embodiments of the present invention.

Referring now to FIG. 6, shown therein is a method to practice an embodiment of the present invention. It should be recognized that the steps presented in the described embodiments of the present invention do not require any particular sequence. In step 602, a random access memory magazine 204 is searched for among a plurality of random access memory magazines. As previously disclosed, each of the magazines can comprise a magazine identifier label 202 and an electronic magazine identifier 206. A means for searching for the [specific] magazine 204 could be accomplished by using a table system wherein the table could have knowledge of the magazine's 204 location, for example. In another example, the magazine could be searched for by a person or robot capable of reading a magazine identification label 202. In yet another example the magazine could be searched for by an RF sensor if the magazine identification label 202 is an RF transmitter. Alternatively, the magazine 204 could be searched for by a program querying the plurality of magazines if the magazines are communicatively linked with an electronic search means, such as a storage device 210, through an electronic magazine identifier, such as 206 for example. It should be appreciated that the examples of means for searching for the magazine 204 location are not limited to those presented here and could equally be employed without departing from the scope of the present invention. Block 604 shows the step of identifying the random access memory magazine 204 through the search process from the magazine identifier label 202, the electronic magazine identifier 206, or both. Step 606 shows that once the magazine 204 is identified, the storage device 210 can be enabled to use the magazine 204. Means for enabling the storage device 210 for using the magazine can be accomplished by a positioning means, such as a robotics system positioning a magazine 204 for use with a device adapted to read and write with the magazine 204. If the magazine is already linked to the storage device 210, enabling the magazine 204 may simply require a mapping routine and a switch system to make the magazine 204 activated in a state ready for use.

Figure 7:
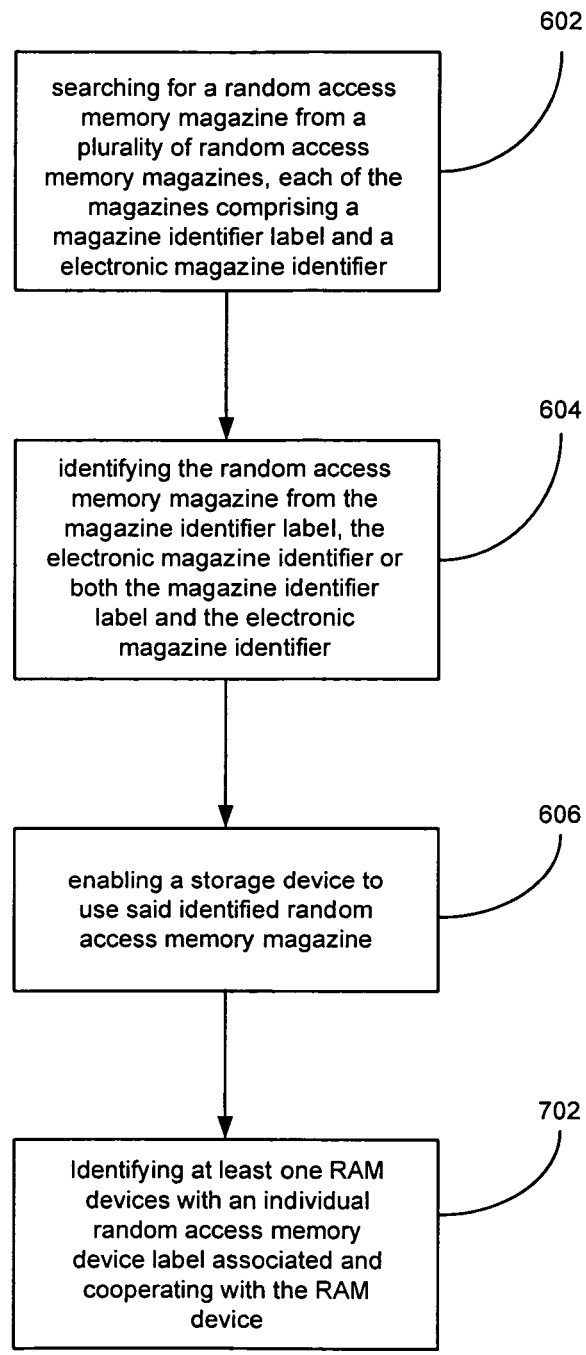
FIG. 7 shows an alternative embodiment of FIG. 6 wherein at least one RAM device is identified by an individual RAM device label in accordance with an embodiment of the present invention.

FIG. 7 is an alternative embodiment of the present invention which includes method steps 602, 604 and 606 from FIG. 6. Step 702 is a block in which at least one RAM device, such as 502, is identified by an individual RAM device label, such as 310, associated and cooperating with the RAM device 502. The individual RAM device label 310 could be a bar code system similar to the magazine identifier label 202 or something different, such as a color scheme, pattern scheme or a signal producing scheme, just to name three examples. Advantages of having an individual RAM device label 310 can include the ability to identify a specific RAM device, such as 502, from a specific magazine, such as 500, and among a plurality of RAM devices removed from their respective magazines (which can be useful for making magazine repairs).

Figure 8:
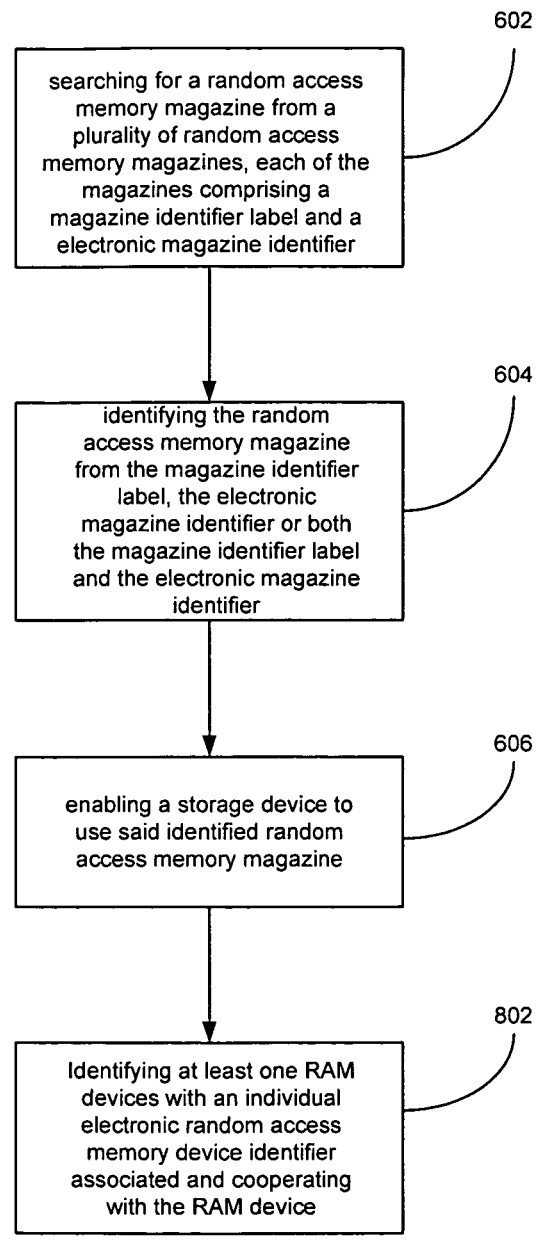
FIG. 8 shows an alternative embodiment of FIG. 6 wherein at least one RAM device is identified by an individual electronic RAM device identifier in accordance with an embodiment of the present invention.

FIG. 8 is yet another alternative method embodiment of the present invention which includes method steps 602, 604 and 606 from FIG. 6. Step 802 is a block in which at least one RAM device, such as 502, is identified by an individual electronic RAM device identifier, such as 510, associated and cooperating with the RAM device 502. The individual electronic RAM device identifier 510, in a preferred embodiment, contains electronic content that represents a corresponding individual RAM device label, such as 310. An example of using the individual electronic RAM device identifier 510 and the individual RAM device label 310 could be with a disc drive, such as 106, disposed in the disc drive magazine 101. A disc drive could support the individual RAM device label 310 on the outer cover with the corresponding individual electronic RAM device identifier 510 stored in the disc drive 106. Advantages of having an individual electronic RAM device identifier 510 and the individual RAM device label 310 could include those disclosed in the description of FIG. 7 in addition to confirming that the proper RAM devices, such as 502, are with the proper magazine, such as 500 for example.

In some other embodiments of the present invention, means for using a mobile media identification system will now be discussed. A magazine, such as the disc drive magazine 101, includes at least two identification means. The identification means could be accomplished with a magazine identification label, such as 202, and magazine identifier, such as 206 or with alternative means such as sonic tags, audio transmitters, or other audio transducer means, identification chips, lasers, or other light means, RF means or color schemes on the magazines just to name a few. In a preferred embodiment, the at least two identification means would be configured to correspond to one another with consistent identification information. The at least two identification means facilitates flexibility in identifying the magazines, such as the disc drive magazine 101. The means for identifying the magazines should support the identification means. Hence, for example, if the identification means is a brail pad located on a magazine then the means to identify the brail pad should be something capable of reading the brail pad. Also, in addition to the at least two means for identifying a magazine, at least one means for identifying at least one RAM device, such as a disc drive 106, could be used in an alternative embodiment. Such means could be as previously disclosed for identifying a magazine, such as the disc drive magazine 101.

Figure 9:
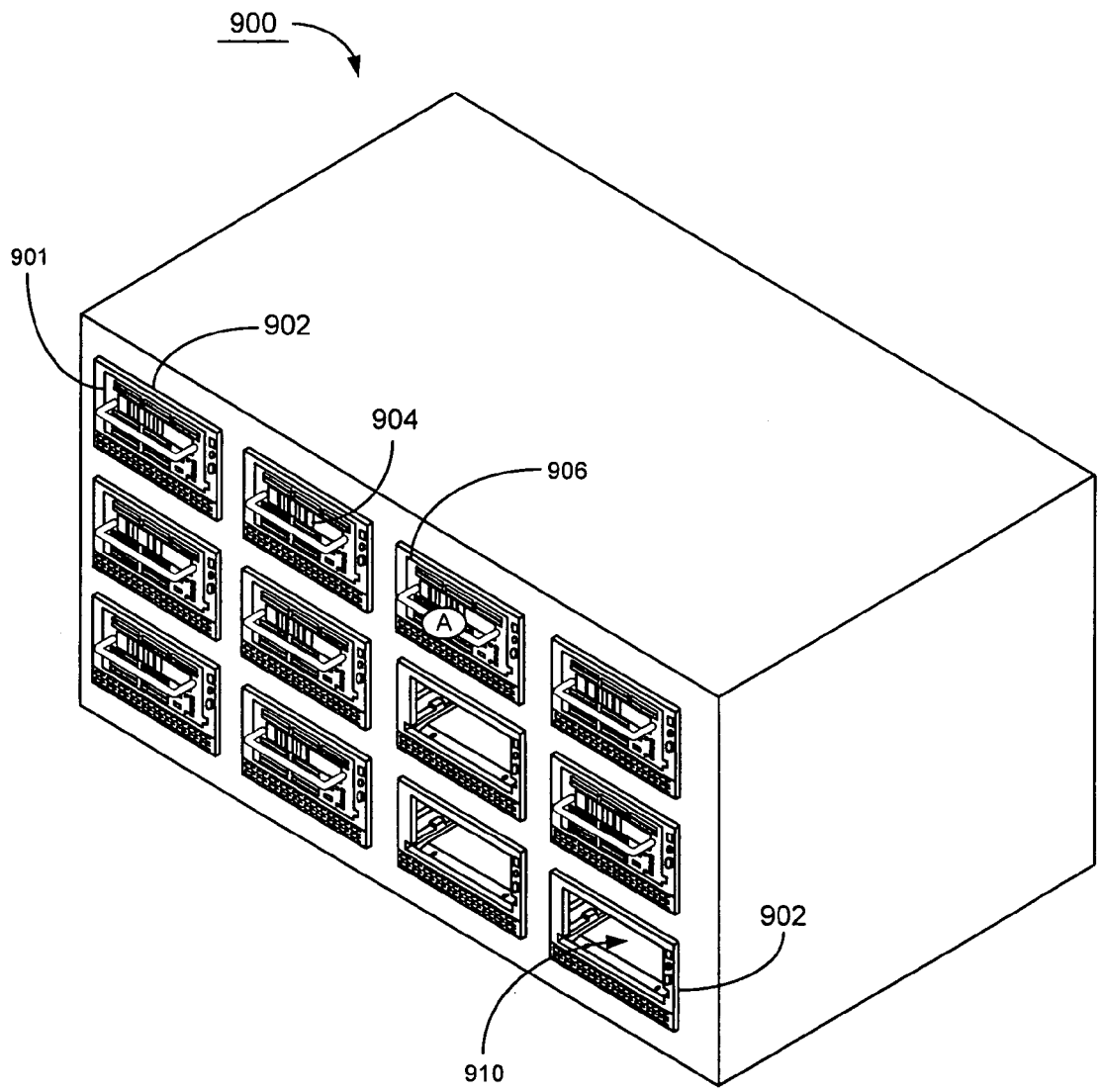
FIG. 9 is a perspective drawing of a Spectra Logic RXT storage system wherein embodiments of the present invention could be commercially practiced.

As shown in FIG. 9, embodiments of the present invention could be commercially practiced with an RXT storage system 900, performing as a storage device 210, for use with RXT disc drive magazines 901 from Spectra Logic Corporation of Boulder, Colo. The RXT disc drive magazines 901 all have a bar code magazine identifier label 904 having a particular serial number disposed on the face of the RXT 901 in an externally viewable location. The RXT disc drive magazine 901 encases a plurality of disc drives, such as 106, which can be provided by Seagate Corporation of Scotts Valley, Calif. Here, the RXT magazines 901 are removable and capable of being archived in a location, such as a vault, separate from the RXT storage system 900 for long term storage. In one scenario, an RXT magazine [A] 906 can be searched for by using a bar code scanner to identify the RXT magazine [A] 906 when located in a vault with a number of other RXT magazines 901. The RXT magazine [A] 906 can be taken to the RXT storage system 900 and inserted in an opening 910 in the face of an RXT docking station 902. Once inserted, the RXT magazine [A] 906 is enabled to be used with the RXT storage system 900 by electrical contacts (not shown) between an RXT magazine 901 and docking station 902. The RXT storage system 900 can then confirm the identity of the RXT magazine [A] by electronically querying the serial number of the RXT magazine [A] 906 stored as the electronic magazine identifier on each of the disc drives contained by the RXT magazine [A] 906. In another scenario, RXT magazine [A] 906 could be already installed in the RXT storage system 900 along with other magazines 901. The RXT magazine [A] 906 could be searched by a querying algorithm in the RXT storage system 900 software looking for the serial number corresponding to RXT magazine [A] 906 stored as the electronic magazine identifier on each of the disc drives contained by the RXT magazine [A] 906. The RXT storage system 900 could then enable RXT magazine [A] 906 by activating it for use.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the content of the magazine identifier label, such as label 202, could be combined with the individual RAM device label, such as RAM device label 310, and individual electronic RAM device identifiers, such as IERAMDI [A1] 510, and in addition could be combined with multiple magazines for a specific storage device, such as device 210, while still maintain substantially the same functionality without departing from the scope and spirit of the present invention. Further, any or all of the RAM devices, such as device 502, comprising the magazine, such as magazine 500, could also comprise the electronic magazine identifier, such as 206, without departing from the scope and spirit of the present invention. Finally, although the preferred embodiments described herein are directed to mobile media magazines, such as the magazine 500, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A mobile media identification system for use with a storage device comprising:
    a magazine consisting of a plurality of disc drives, flash memory devices or a combination thereof wherein the magazine is mobile thus becoming capable of reading and writing data when the magazine is physically moved into a position that connects the magazine with a docking station;
    the magazine comprising a magazine identifier label disposed to be externally viewable;
    the magazine comprising at least one storage element that stores, in non-volatile memory, an electronic magazine identifier corresponding with the magazine identifier label; and
    the storage device adapted to identify the magazine via the magazine identifier label regardless of the magazine being connected with the docking station;
    the magazine further capable of being identified via the electronic magazine identifier when the magazine is connected with the docking station.

2. The mobile media identification system of claim 1 wherein magazine is a disc drive magazine.

3. The mobile media identification system of claim 1 wherein the magazine identifier label is disposed on the outer surface of the magazine.

4. The mobile media identification system of claim 1 wherein the at least one storage element is one of the disc drives.

5. The mobile media identification system of claim 1 wherein the at least one storage element is one of the flash memory devices.

6. The mobile media identification system of claim 1 wherein each of the disc drives or flash memory devices further comprise the magazine identifier label.

7. The mobile media identification system of claim 1 wherein each of the disc drives or flash memory devices further comprise an individual random access memory device label.

8. The mobile media identification system of claim 7 wherein each of the disc drives or flash memory devices each retain an individual electronic random access memory device identifier that corresponds to the individual random access memory device label.

9. The mobile media identification system of claim 1 wherein the magazine is identified by the magazine identifier label in a robotics based library and the magazine is identified by the electronic magazine identifier in a non-robotics based library.

10. The mobile media identification system of claim 7 wherein either the magazine identifier label is a bar code, the individual random access memory device label is a bar code, or both the magazine identifier label and the individual random access memory device label are bar codes.

11. The mobile media identification system of claim 1 wherein the storage device is adapted to identify the magazine via the magazine identifier label and the electronic magazine identifier when the magazine is connected with the docking station.

* * * * *